(12) United States Patent
Leuthold

(10) Patent No.: US 6,580,844 B2
(45) Date of Patent: Jun. 17, 2003

(54) BROADBAND WAVELENGTH-DIVISION MULTIPLEXER/DEMULTIPLEXER

(75) Inventor: Juerg Leuthold, Eatontown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/841,103

(22) Filed: Apr. 24, 2001

(65) Prior Publication Data

US 2002/0154849 A1 Oct. 24, 2002

(51) Int. Cl.⁷ .................................................. G02B 6/26
(52) U.S. Cl. .......................................... 385/15; 385/27
(58) Field of Search ............................... 385/27, 28, 14, 385/129–132, 49, 15, 24; 359/116, 115, 124

(56) References Cited

U.S. PATENT DOCUMENTS

| | | | | |
|---|---|---|---|---|
| 4,846,540 A | * | 7/1989 | Kapon | 385/130 |
| 5,379,354 A | * | 1/1995 | Jenkins | 385/46 |
| 5,629,992 A | * | 5/1997 | Amersfoort et al. | 385/14 |
| 5,748,811 A | * | 5/1998 | Amersfoort et al. | 385/15 |
| 5,852,691 A | * | 12/1998 | Mackie | 385/14 |
| 5,933,554 A | * | 8/1999 | Leuthold et al. | 385/14 |
| 2001/0053262 A1 | * | 12/2001 | Kinoshita et al. | 385/24 |

OTHER PUBLICATIONS

Janz et al. "Bent Waveguide Couplers for (De)Multiplexing of Arbitrary Broadly–Separated Wavelengths Using Two–Mode Interference" IEEE Photonics Technology Letters, vol. 7, No. 9, Sep. 1995.*

Zhang et al., "Integrated 1.3 um/1.55um Wavelength Multiplexer and 1/8 Splitter by Ion Exchange Glass" Electronics Letters, Jun. 10, 1993 vol. 29 No. 12.*

O'Gorman, J., Levi, A.F. "Wavelength dependence of T(sub) 0 in InGaAsP semiconductor laser diodes", Applied Physics Letters, 62(17), Apr. 26, 1993, pp 2009–2011.*

Besse et al. "New 2x2 and 1x3 Multimode Interference Couplers with Free Selection of Power Splitting Ratios", Journal of Lightwave Technology, vol. 14, No. 10, Oct. 1996, pp. 2286–2293.*

Li et al, "Low–Loss 1x2 Multimode Interference Wavelength Demultiplexer in Silicon–Germanium Alloy", IEEE Photonics Technology Letters, vol. 11, No. 5, May 1999, pp. 575–577.

Leuthold et al, "Multimode Interference Couplers for the Conversion and Combining of Zero– and First–Order Modes", Journal of Lightwave Technology, vol. 16, No. 7, Jul. 1998, pp. 1228–1239.

* cited by examiner

Primary Examiner—Robert H. Kim
Assistant Examiner—Krystyna Suchecki

(57) ABSTRACT

A broadband wavelength-division multiplexer comprises two input waveguides for two input signals, each of which is from a different wavelength band, a multi-mode interference waveguide for producing an output wavelength-division multiplexed (WDM) signal comprising the two input signals where at least one of the two input signals is partially coupled to produce the output WDM signal, and an output waveguide for providing the output WDM signal. Optionally, at least another output waveguide can be used to trap all or some power not coupled to produce the output WDM signal.

19 Claims, 5 Drawing Sheets

100

1.3 μm LIGHT 1.55 μm LIGHT

500

(a) DEMULTIPLEXER (b) MULTIPLEXER

BROADBAND WAVELENGTH-DIVISION MULTIPLEXER/DEMULTIPLEXER

FIELD OF THE INVENTION

The present invention relates to optical wavelength couplers and, more particularly to broadband wavelength-division multiplexers and demultiplexers.

BACKGROUND OF THE INVENTION

A wavelength-division multiplexing (WDM) technique is a technique to combine (multiplex) input signals at different wavelengths so that they can be coupled into the same fiber or waveguide. The resulting signal is called a WDM signal. The optical device that multiplexes signals at different wavelengths into a WDM signal is called a wavelength-division multiplexer, whereas the one that demultiplexes a WDM signal into signals at different wavelengths is called a wavelength-division demultiplexer. The term broadband thereby refers to multiplexed signals within a broad spectral range such as from 1.25 $\mu$m to 1.35 $\mu$m in the 1.3 $\mu$m wavelength band.

Low cost broadband wavelength-division multiplexers and demultiplexers with inputs from more than one wavelength band may find applications in bi-directional transmitter-receiver devices in a WDM communication system, where different wavelength bands are used for the two propagation directions of the signals. They also may be used to add an additional wavelength to supplement capacity at another wavelength and may be used for many other applications.

Generally, one way to lower the cost is to reduce the size of a broadband wavelength-division multiplexer or demultiplexer. Another way is to design a broadband wavelength-division multiplexer or demultiplexer that can be monolithically integrated with other optical devices such as lasers and photodetectors. The reason that monolithic integration can lower the cost is that the manufacturing and maintaining cost is generally cheaper.

In an article "Low-Loss 1×2 Multimode Interference Wavelength Demultiplexer in Silicon-Germanium Alloy", IEEE Photonics Technology Letters, Vol. 11. No. 5, May 1999, pp. 575–577, by Li et al. proposed the application of the multi-mode interference (MMI) principle to a wavelength-division demultiplexer that can be monolithically integrated with silicon-based devices. The MMI principle is based on the self-imaging principle, wherein an input signal to a MMI waveguide is reproduced in single or multiple images at periodic intervals along the propagation direction of the MMI waveguide. Unfortunately, the length of the MMI waveguide in this demultiplexer is approximately 2,600 $\mu$m.

SUMMARY OF THE INVENTION

In accordance with the invention, the length of a MMI waveguide used in a broadband wavelength-division multiplexer having inputs from different wavelength bands can be shorter than 2600 $\mu$m.

The multiplexer can be implemented in InGaAsP/InP, silica on silicon and many other materials to achieve the same multiplexing/demultiplexing with a device length shorter than 2600 $\mu$m.

The invention is about a wavelength multiplexer/demultiplexer with compact dimension and complete multiplexing/demulitplexing for one wavelength band, but only partial multiplexing/demultiplexing for the other wavelength band. The partial multiplexing/demultiplexing is an important step, since it allows to reduce dimension of the MMI wavelength multiplexer/demultiplexer considerably in comparison with a devise that provides complete multiplexing/demultiplexing.

One embodiment of the invention is a broadband wavelength-division multiplexer that comprises two input waveguides for two input signals, each of which is from a different wavelength band, a MMI waveguide for producing an output WDM signal from the two input signals, and a WDM output waveguide for coupling out the output WDM signal. Optionally, at least another output waveguide can be used to trap all or some power not coupled to produce the output WDM signal.

Another embodiment of the invention is a broadband wavelength-division demultiplexer for demultiplexing an input WDM signal of wavelengths from two wavelength bands. The broadband wavelength-division demultiplexer comprises one input waveguide, a MMI waveguide for producing two output signals where the MMI waveguide couples partial power from one of the two wavelength bands and substantially no power from the other wavelength band to produce one of the two output signals at one of the wavelength bands, and two output waveguides for providing the two output signals.

It is evident, that the multiplexer and or demultiplexer operation can be implemented into the same device.

BRIEF DESCRIPTION OF THE DRAWINGS

The present invention will be more fully appreciated from a consideration of the following Detailed Description, which should be read in light of the accompanying drawings in which.

DETAILED DESCRIPTION

Figure 1:
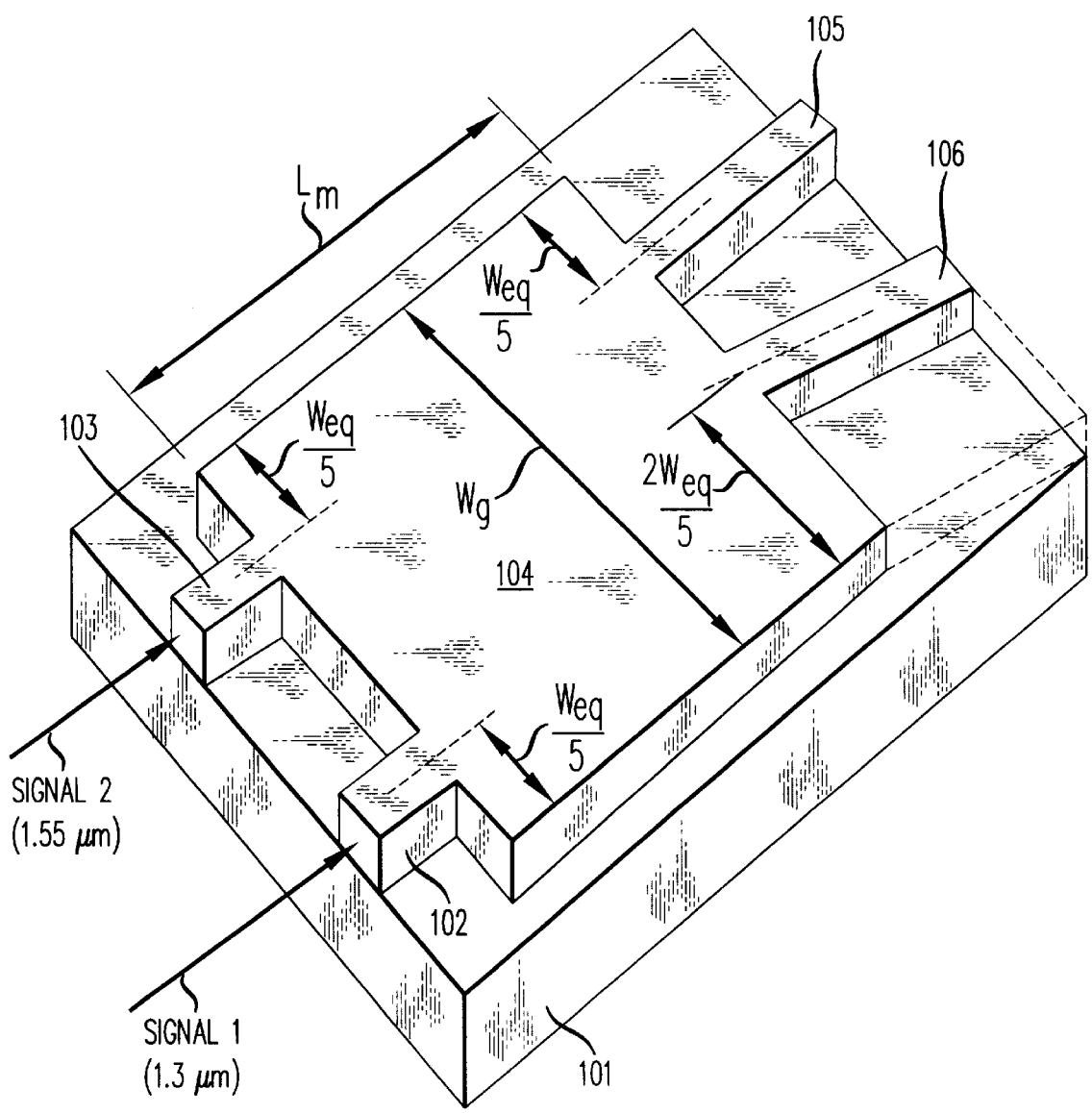
FIG. 1 shows the cross section view of an exemplary broadband wavelength-division multiplexer/demultiplexer in accordance with the principles of the invention.

An exemplary semiconductor structure of a multiplexer in accordance with the teaching of this invention is shown in FIG. 1. (It should be noted that the same device can be used as demultiplexer as illustrated later in the specification.) Multiplexer 100 is enclosed by cladding material 101 of lower refractive index. The multiplexer 100 comprises input waveguides 102 and 103, multi-mode interference (MMI) waveguide 104, and output waveguides 105 and 106. Output waveguide 106 is optional. In this exemplary structure, the cladding material is InP and the exemplary material used for the guiding layer (waveguides) of multiplexer 100 is InGaAsP with bandgap at 1.20 $\mu$m (briefly called Quaternary 1.2 $\mu$m material).

Multiplexer 100 produces an output WDM signal (not shown) at output waveguide 105 from two input signals, signal 1 of wavelength 1.3 µm applied to input waveguide 102 and signal 2 of wavelength 1.55 µm applied to input waveguide 103. MMI waveguide 104 has a geometric length $L_m$ and width $W_g$. The geometric length and width of a MMI waveguide are measured in the propagation and lateral directions, respectively. The propagation direction of MMI waveguide 104 is the direction from the input side to the output side of the MMI waveguide, and lateral direction is the one perpendicular to the propagation direction. The equivalent width, $W_{eq}(\lambda)$, of a MMI waveguide with respect to a wavelength λ essentially corresponds to the geometric width $W_g$ of the MMI waveguide but takes into account the penetration into the surrounding material. In accordance with the principles of the invention, input waveguides 102 and 103 are illustratively positioned $W_{eq}/5$ away from the respective nearby sides of MMI waveguide 104 measured to the respective centers of the input waveguides. Output waveguide 105 for the output WDM signal is positioned $W_{eq}/5$ from the top side of MMI waveguide 104 measured to the center of output waveguide 105. Optional output waveguide 106 (shown in solid lines) is positioned at $2W_{eq}/5$ from the bottom side of MMI waveguide 104 measured to a point where the center of output waveguide 106 and the top edge of the output side of MMI waveguide 104 intersect, and can be extended to the bottom side of MMI waveguide 104 (as shown in dashed lines). In this example, $W_g$=6 µm, $W_{eq}$=6.6 µm, and $L_m$=420 µm. $W_{eq}$ is an average value of the equivalent width $W_{eq}$ as obtained for light at 1.3 µm and light at 1.55 µm. Under this set of parameters, multiplexer 100 couples substantially all power of signal 1 (1.3 µm) and only about 70% of signal 2 (1.55 µm) to produce the output WDM signal at output waveguide 105. In other words, the coupling efficiencies of multiplexer 100 for signals 1 and 2 are substantially 100% and about 70%, respectively. Output waveguide 106 (shown in solid lines), extended to the edge of MMI waveguide 105 (shown in dashed lines), is used to capture the remaining power of signal 2 (1.55 µm).

Figure 2:
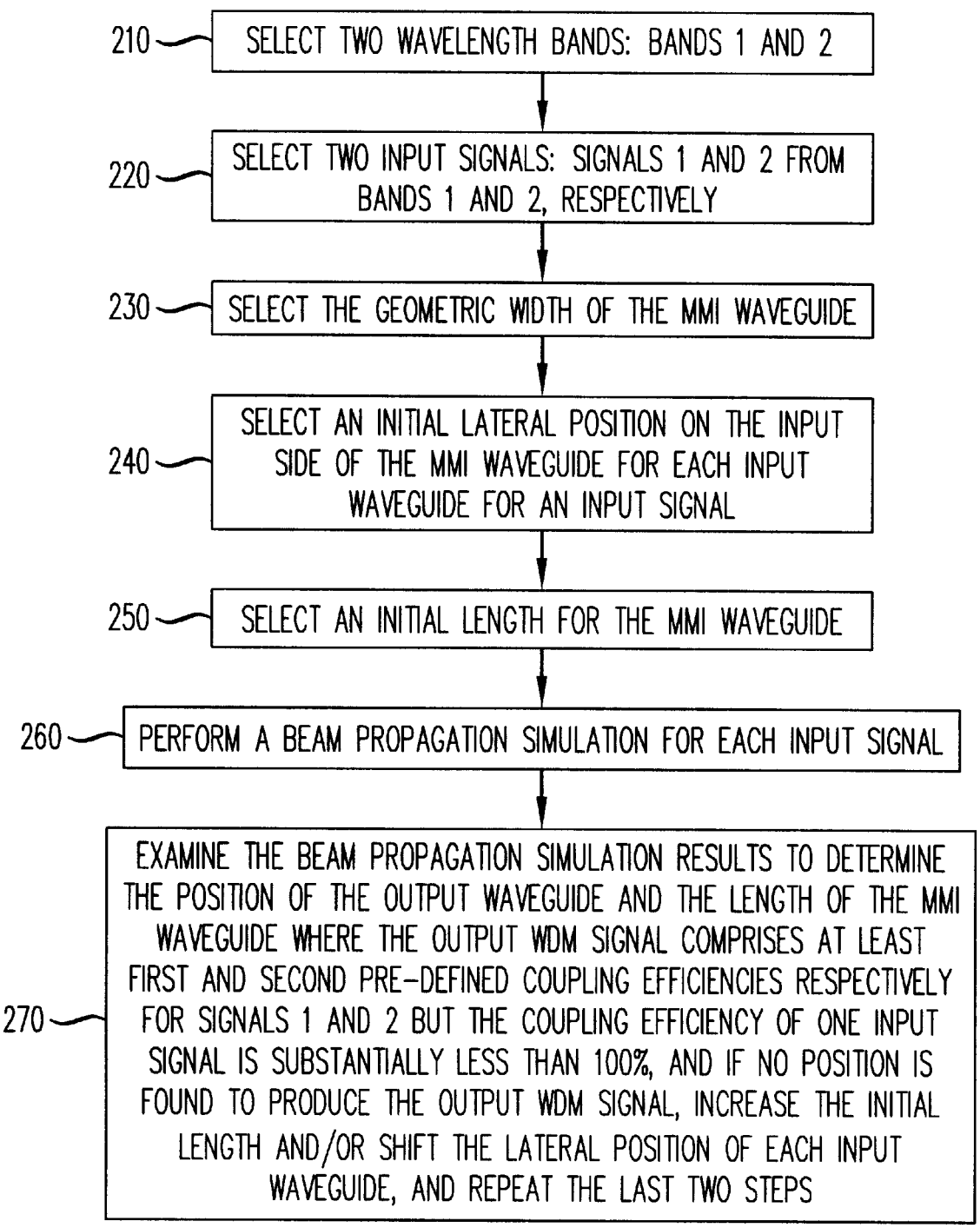
FIG. 2 shows the method of designing a broadband wavelength-division multiplexer in accordance with the principles of the invention.
Figure 3A:
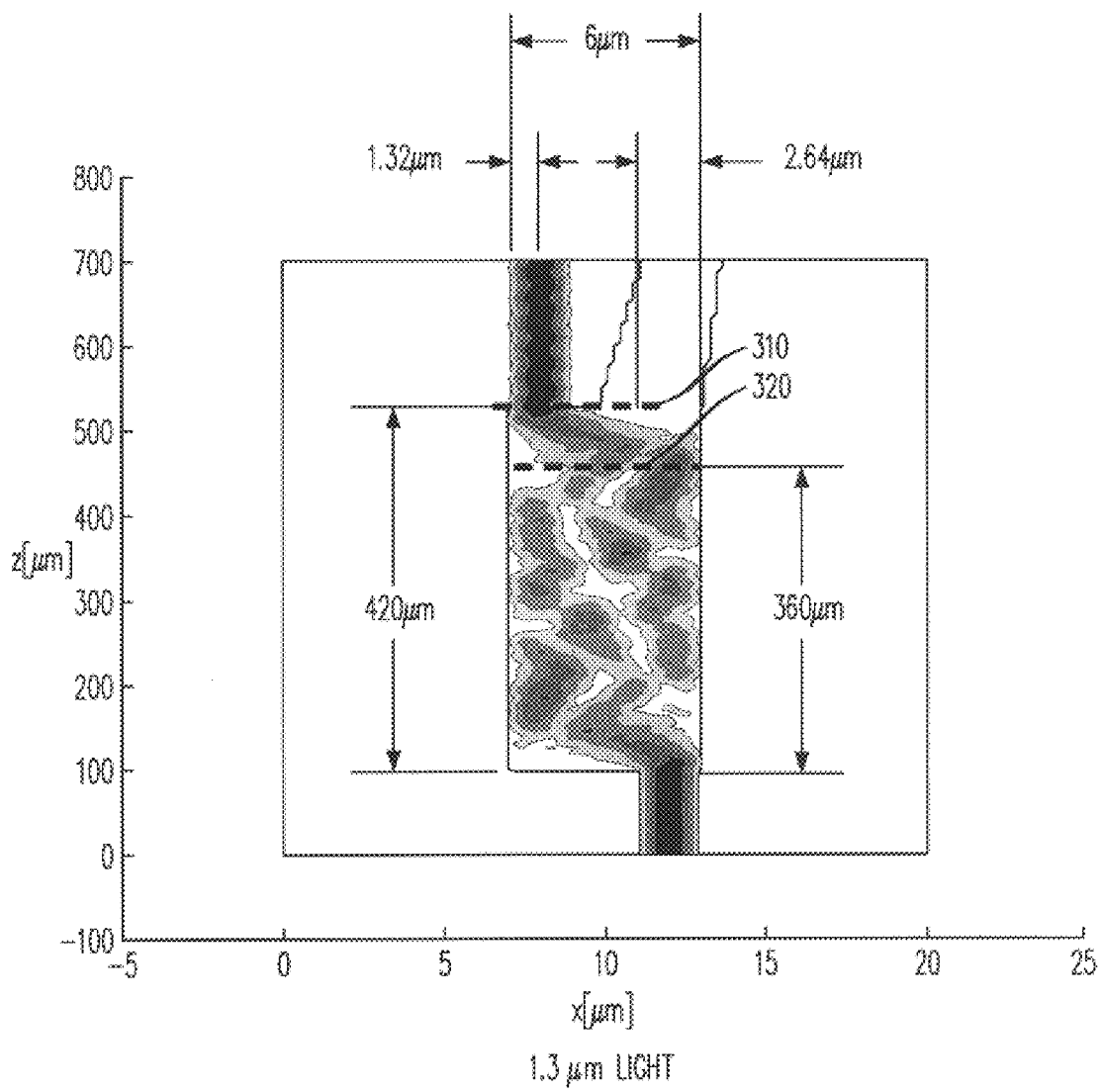
FIG. 3 shows illustrative beam propagation simulation results of the broadband wavelength-division multiplexer in FIG. 1.
Figure 3B:
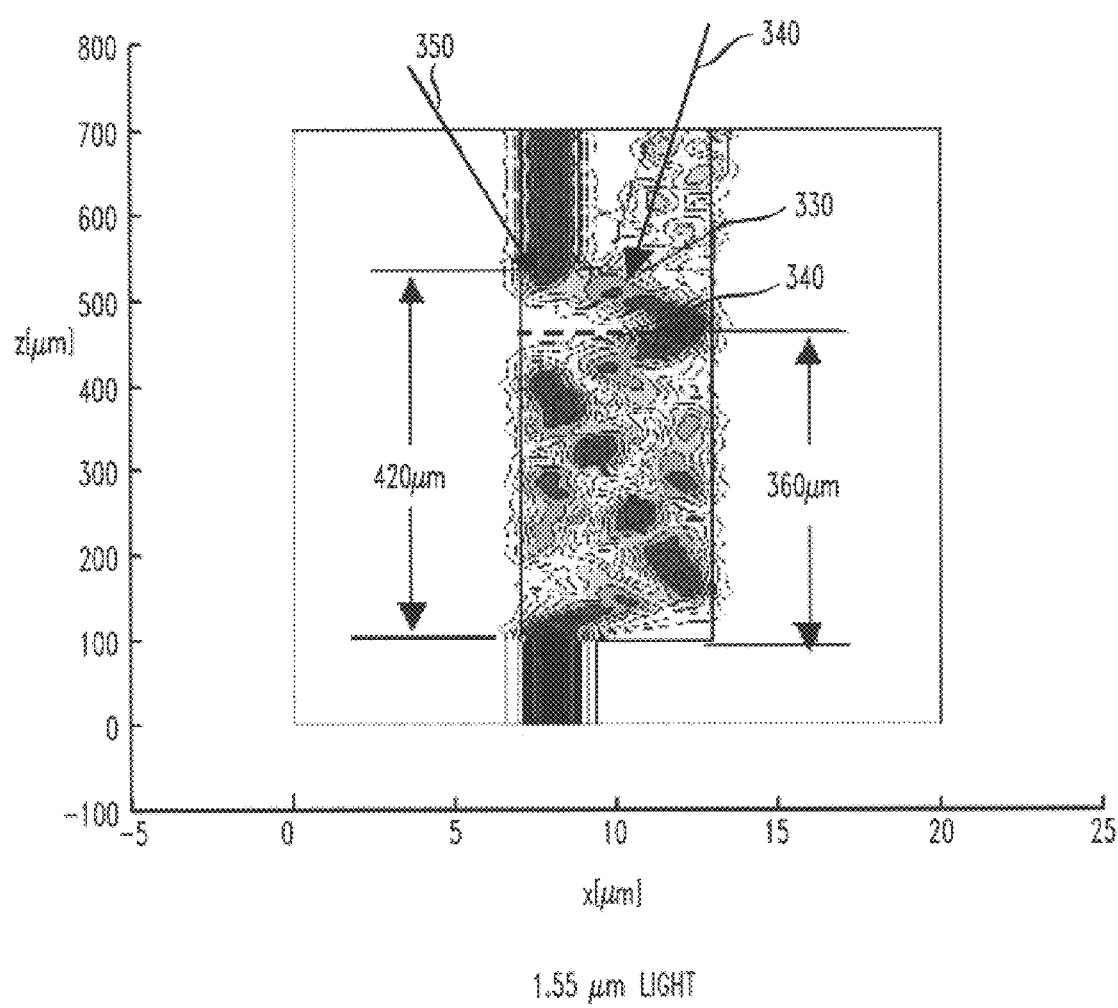

The method for designing a multiplexer that couples partial power from at least one of two input signals is described in this paragraph using the multiplexer in FIG. 1 as an example. The method is shown in FIG. 2. At step 210, two wavelength bands are selected. For example, the 1.3 µm and 1.55 µm bands are selected. At step 220, two input signals, signals 1 and 2, each of which are from a different one of the two selected wavelength bands from step 210, are selected. For example, signals 1 and 2 are single wavelength signals of wavelengths 1.3 µm and 1.55 µm, selected from respective bands. (Each input signal can also be a WDM signal from a different one of the selected wavelength bands.) At step 230, the geometric width, $W_g$, of a MMI waveguide is selected. For example, $W_g$ is 6 µm but it can be any width that is larger than the sum of the widths of the two input waveguides. At step 240, initial lateral positions of the two input waveguides on the input side of the MMI waveguide are selected. For example, waveguides 102 and 103 are respectively positioned $W_{eq}/5$ or 1.32 µm away from the respective nearby sides of MMI waveguide 104. At step 250, an initial simulation length for the MMI waveguide is selected. The actual length is determined at step 270. For example, an initial simulation length of 420 µm is selected. At step 260, a beam propagation simulation is performed for each input signal. Beam propagation simulation techniques are known in the art and not discussed herein. It should be noted that if an input signal is a WDM signal from a wavelength band, the median wavelength for the wavelength band is used in the simulation. In this example, illustrative beam propagation simulation results are shown in FIG. 3(*a*) for signal 1 (1.3 µm) and FIG. 3(*b*) for signal 2 (1.55 µm). Finally, at step 270, the two beam propagation simulation results are examined to determine the actual length of the MMI waveguide and the lateral position of a potential output waveguide, where an output WDM signal which comprises at least first and second pre-defined percentages of power respectively from signals 1 and 2 is produced. If no position can be found to produce the output WDM signal meeting the criteria, the simulation length of the MMI waveguide is increased and/or the lateral position of each input waveguide is shifted, and the last two steps, steps 260 and 270, are repeated.

Turning now to FIG. 3, it shows the illustrative beam propagation simulation results for signals 1 and 2. The x and z axes indicate respectively the geometric width and lengths of the multi-mode interference waveguide. Each gray spot represents some power of the input signal. The darker the spot, the more power it represents. For example, in FIG. 3(*b*), the gray spot pointed to by arrow 350 has more power than the one pointed to by arrow 360. At the cross section of a given length (z axis), if there is only one gray spot, the gray spot (which should appear quite dark because of the high power) represents substantially 100% of the power of the input signal. If there is more than one gray spot, each represents only partial power of the input signal. The coupling efficiency of the light from a gray spot into an output waveguide at a particular position can be roughly estimated. It should be noted that the above method assumes that the output waveguide is able to carry all the modes of the light at that spot. (A mode as known in the art is a stable pattern in which a light wave can travel along a waveguide; its details are not described herein.) If the output waveguide carries only some modes, the power of the output WDM signal is reduced by the power of the remaining modes. For more accurate estimates, one can obtain data from the simulation program which, as known in the art, can give values for the total power of a gray spot and the power of each mode of the light in that gray spot. The preferred first and second pre-defined coupling efficiencies for signals 1 and 2 are substantially 100% and 50%, respectively. Other choices such as 50% for both can be used in the method as well. It should be noted that the position selected must produce a WDM signal that comprises partial power from at least one of the input signals.

In this example, the pre-defined first and second coupling efficiencies respectfully for signals 1 and 2 are substantially 100% and 50%. From FIG. 3(*a*), it is observed that at the cross section (shown as dashed line 310) at a geometric length of 420 µm, there is only one gray spot and is located on the left side. Thus, this gray spot represents substantially all power from signal 1 (1.3 µm) and its location is a candidate position for the output waveguide. Examining the candidate position in FIG. 3(*b*) (at the left of dashed line 330) for signal 2 (1.55 µm), although there is more than one gray spot in the cross section (shown as dashed line 330), the gray spot (pointed to by arrow 350) on the candidate position represents the highest intensity. Considering the intensities and the widths of the gray spot at the candidate position and other gray spots in that cross section, it is estimated that the power of the gray spot in the candidate position represents approximately 70% of the power of signal 2. Thus, this position produces an output WDM signal comprising power within the selected power range from each input signal (step 230) and, thus, is selected as the location for the output waveguide. To locate the center of the output waveguide, one overlaps the two simulation results and locates the center of the overlapped area of the selected gray spot for signal 1 and the one for signal 2. In this example, it is observed that the center is located at $^{W_{eq}}/_5$ or 1.32 μm from the left side of the MMI waveguide. It should be noted that this method is iterative in nature. In this example, the selected initial simulation length resulted is the actual length of the MMI waveguide. In other cases, when no position can be found to satisfy the desired coupling efficiencies, the simulation length of the MMI waveguide should be increased and steps 260 and 270 should be repeated. The process should continue until a position meeting the selected coupling efficiencies is found.

Similarly, in the example, the position of optional output waveguide 106 is found to be $^{2W_{eq}}/_5$ or 2.64 μm from the other side of MMI waveguide 104. This position is the center of the spread of the remaining power. It should be noted that more than one optional output waveguide can be used to trap the remaining power of either or both signals. Those skilled in the art would appreciate that the principles of the invention can be extended to more than two input waveguides with signals from more than two wavelength bands. Also, those skilled in the art would appreciate that the principles can be extended to MMI waveguides that are not rectangular such as parabolic, circular or other kind of MMI shapes.

Using the method outlined above, many other points can be selected to produce an output WDM signal. For example, if substantially all power from signal 2 (1.55 μm) and partial power from signal 1 (1.3 μm) are required in the output WDM signal, MMI waveguide 104 would be about 360 μm as shown in FIG. 3(*b*) because there is only one gray spot at that cross section (shown as dashed line 340) for signal 2 and at the same position in FIG. 3(*a*) (at the right side of dashed line 320), there is a high intensity gray spot for signal 1. Thus, partial power of signal 1 and substantially all power from signal 2 would be coupled to produce the required output WDM signal that position, and the output WDM signal would now be produced approximately at output waveguide 106. In this case, some of the remaining power of signal 1 would be trapped approximately at output waveguide 105.

Figure 4:
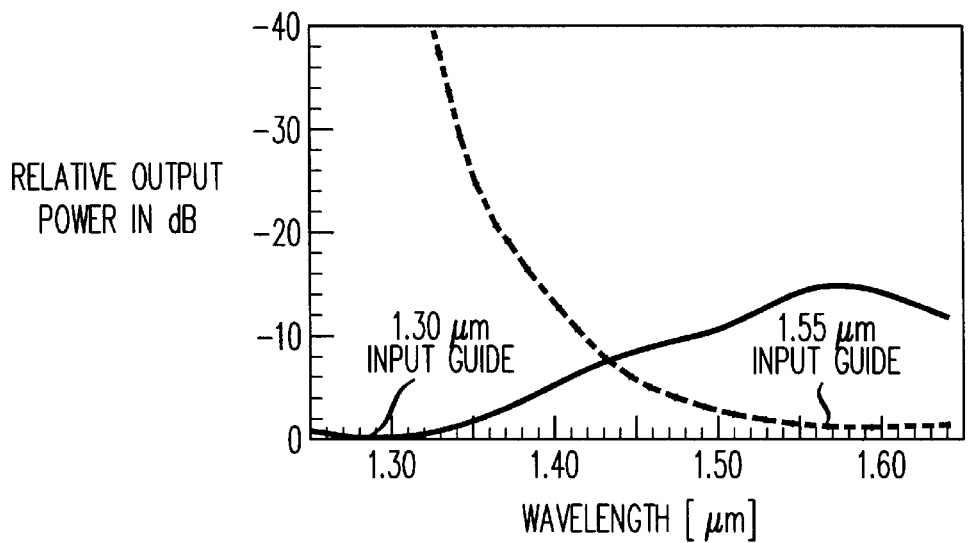
FIG. 4 shows illustrative relative output power of an input signal from each input waveguide of the broadband wavelength-division multiplexer in FIG. 1.

Another advantage of the invention is that an input signal can be either a single wavelength or a WDM signal. An input signal can be a WDM signal as long as the wavelengths are from the same wavelength band. FIG. 4 demonstrates that multiplexer 100 can support two WDM signals, each from a different one of the two wavelength bands, 1.3 μm and 1.55 μm, because the transmission level is quite flat in the two bands. In addition, the input, or multiplexed signals at the output may be fundamental mode signals or comprise higher order modes (be a multi-mode signal).

Figure 5:
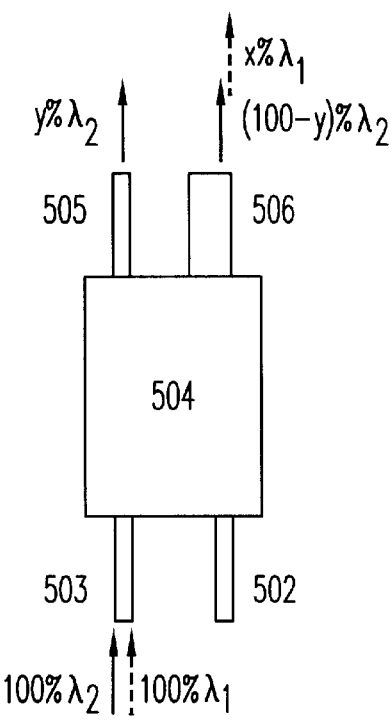
FIG. 5 shows illustrative signal power distributions between two output ports when the same device is used as a broadband wavelength-division demultiplexer and multiplexer, respectively.
Figure 5:
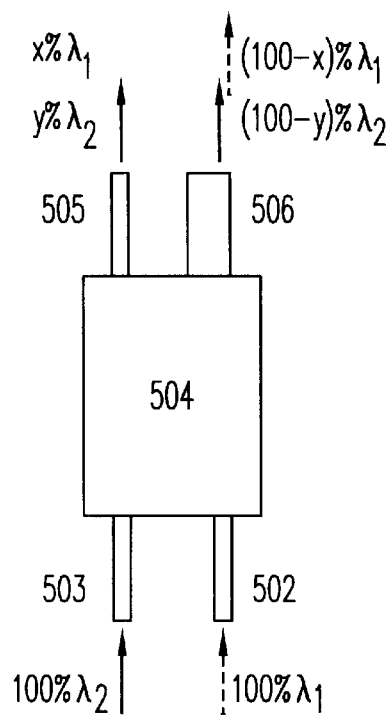

As pointed out above, the multiplexer in FIG. 1 can also be used as a demultiplexer. FIG. 5 shows the same device used as a demultiplexer and a multiplexer. As shown in FIG. 5(*a*), the input signal for device 500 used as a demultiplexer is applied at input waveguide 503. In FIG. 5(*a*), the input signal is a WDM signal of wavelengths $\lambda_1$ and $\lambda_2$ respectively from two different wavelength bands. The use of input waveguide 502 is optional when the device is used as a demultiplexer and, in fact, does not have to be included in the device. Device 500 used as a demultiplexer produces two output signals: an output signal of single wavelength band at output waveguide 505, and the other output signal of both wavelength bands at output waveguide 506. In FIG. 5(*a*), for example, y % of the power from wavelength $\lambda_2$ in the input WDM signal and no power from wavelength $\lambda_1$ in the input WDM signal are contributed to the output signal produced at output waveguide 505, and x % of power from wavelength $\lambda_1$ in the input WDM signal and (100−y)% of power from wavelength $\lambda_2$ in the input WDM signal are contributed to the output signal produced at output waveguide 506. It can be observed that, unlike a prior art splitter, this demultiplexer does not extract a fraction of power from all wavelengths of the input WDM signal. Thus, this demultiplexer can be used to extract a multi-cast message carried by a specific wavelength of an input WDM signal at certain node of an optical network and at the same time pass the multi-cast message to the downstream nodes by the same WDM signal without going through another multiplexing step. It should be noted that the principle can be extended to input WDM signals of more than two wavelength bands.

FIG. 5(*b*) shows the same device used as a multiplexer. Here, the two input signals of respective wavelengths $\lambda_1$ and $\lambda_2$ are applied at input waveguides 502 and 503, respectively. When device 500 is used as a multiplexer, MMI waveguide 504 produces two output signals, one each at output waveguides 505 and 506. The output signal produced at waveguide 505 has x % of power from input signal of wavelength $\lambda_1$ and y % of power from input signal of wavelength $\lambda_2$. The other output signal produced at waveguide 506 has (100−x)% and (100−y)% of power from the respective input signals.

In order to design a demultiplexer such as the one shown in FIG. 5(*a*), one first designs a multiplexer in FIG. 5(*b*) in accordance with the method outlined in FIG. 2 using percentages x and y (mentioned above) for selecting a minimum coupling efficiency and a maximum coupling efficiency respectively for input signals of wavelengths $\lambda_1$ and $\lambda_2$. The design method has been described previously and is not repeated here.

Broadband MMI optical multiplexers/demultiplexer other than those disclosed can be implemented using the teachings of the present invention. Numerous modifications to and alternative embodiments of the present invention will be apparent to those skilled in the art in view of the foregoing description. For example, referring to FIG. 1 the material-system used for the guiding layers of the multiplexer can be based on semiconductor compounds (such as InP, GaAs, ternary compound semiconductors, quaternary compound semiconductor materials such as InGaAsP, penternary semiconductor compounds such as InGaAsPN, etc.), plastic materials, glasses (such as silica, silicon, silcon-nitrited), ceramics, 3 dimensional bandgap materials and many other materials. The cladding layer material can be any material as long as the refractive index is lower than the refractive index of the guiding layers. Also the position of the input and output guides with respect to the MMI edge may be different than in this exemplary description. Accordingly, this description is to be construed as illustrative only and is for the purpose of teaching those skilled in the art the best mode of carrying out the invention.

What is claimed is:

1. An optical device for coupling first and second signals from respective wavelength bands, the optical device comprising:

a) a multi-mode interference waveguide having an input side and an output side;
   b) first and second input waveguides connected to the input side of the multi-mode interference waveguide for the respective input signals; and
   c) a first output waveguide connected to the output side of the multi-mode interference waveguide,
   wherein the multi-mode interference waveguide produces an output wavelength-division multiplexed (WDM)

signal at the first output waveguide, said output WDM signal comprises substantially all of the power of said first input signal and only partial power of said second input signal.

2. The optical device of claim 1 further comprising at least a second output waveguide for trapping power of the first and second input signals not coupled to produce said output WDM signal.

3. The optical device of claim 1 wherein the first signal is a single wavelength signal and the second signal is a WDM signal.

4. The optical device of claim 1 wherein the first wavelength band is 1.3 micrometers ($\mu$m) and the second wavelength band is 1.55 $\mu$m.

5. The optical device of claim 1 wherein the multi-mode interference waveguide is rectangular in shape.

6. The optical device of claim 1 wherein the median wavelength of the first signal is 1.3 $\mu$m, and the positions of the first and second input waveguides and the first output waveguide are a predetermined distance away from the respective nearby sides of the multi-mode interference waveguide, said predetermined distance being a function of (a) said median wavelength, (b) the geometric width of said multi-mode interference waveguide, and (c) the penetration of said first signal into the surrounding material of said multi-mode interference waveguide.

7. The optical device of claim 1 wherein the first signal is a single wavelength signal.

8. The optical device of claim 1 wherein the second signal is a single wavelength signal.

9. An optical device for splitting an input wavelength-division multiplexed (WDM) signal of wavelengths from at least two wavelength bands into at least two output signals, the optical device comprising:

a multi-mode interference waveguide, characterized in that
the length of the multi-mode interference waveguide is less than 2600 micrometers ($\mu$m), and partial power from one wavelength band and substantially no power from other wavelength bands are coupled to produce one of the output signals.

10. An optical device for splitting an input wavelength-division multiplexed (WDM) signal of wavelengths from at least first and second wavelength bands into at least first and second output signals, the optical device comprising:

(a) a multi-mode interference waveguide having an input side and an output side;

(b) an input waveguide connected to the input side of the multi-mode interference waveguide for the input WDM signal, (c) first and second output waveguides connected to the output side of the multi-mode interference waveguide for the respective output signals; and wherein partial power from one wavelength band and substantially no power from other wavelength bands are split to produce the first output signal.

11. The optical device of claim 10 wherein the multi-mode interference waveguide is rectangular in shape.

12. The optical device of claim 11 wherein me median wavelength from the first wavelength band is 1.3 $\mu$m, and the positions of the input waveguide and the first output waveguide are a predetermined distance away from the side of the multi-mode interference waveguide closer to said first output waveguide, said predetermined distance being a function of (a) said median wavelength, (b) the geometric width of said multi-mode interference waveguide, and (c) the penetration of said first signal into the surrounding material of said multi-mode interference waveguide.

13. The optical device of claim 12 wherein the first wavelength band is 1.3 $\mu$m and the second wavelength band is 1.55 $\mu$m.

14. The optical device of claim 10 wherein the first output signal is a single wavelength signal.

15. A method for designing an optical device for multiplexing first and second input signals from respective wavelength bands, the optical device comprising first and second input waveguides for the respective input signals, a multi-mode interference waveguide for producing an output wavelength-division multiplexed (WDM) signal, the multi-mode interference waveguide having an input side and output side, and an output waveguide for the output WDM signal, the method comprising the steps of:

(a) selecting the two wavelength bands;

(b) selecting the two input signals from the respective wavelength bands;

(c) selecting the width of the multi-mode interference waveguide;

(d) selecting initial lateral positions on the input side of the multi-mode interference waveguide for the two input waveguides;

(e) selecting an initial simulation length for the multi-mode interference waveguide;

(f) performing a beam propagation simulation for each input signal to produce a result; and (g) examining the two beam propagation simulation results to determine the actual length of the multi-mode interference waveguide and the position of the output waveguide at the cross section of the determined actual length of the multi-mode interference waveguide, where at least first and second pre-defined percentages of power respectively from the two input signals and only partial power of one of the two input signals are coupled to produce the output WDM signal, and if no position is found to produce the output WDM signal, increasing the simulation length of the multi-mode interference waveguide and repeating steps (f) and (g).

16. The method of claim 15 wherein the first and second pre-defined percentages are substantially 100% and 50%.

17. The method of claim 15 wherein the first and second pre-defined percentages are 50%.

18. The method of claim 15 wherein if no position is found to produce the output WDM signal, adjust the lateral positions of the two input waveguides and repeat steps (f) and (g).

19. The method of claim 15 wherein if no position is found to produce the output WDM signal, increase the simulation length of the multi-mode interference waveguide, adjust the lateral positions of the two input waveguides, and repeat steps (f) and (g).

* * * * *